(12) United States Patent
Sugaya

(10) Patent No.: US 6,226,099 B1
(45) Date of Patent: May 1, 2001

(54) PRINTING APPARATUS

(75) Inventor: Akio Sugaya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/073,245

(22) Filed: May 6, 1998

Related U.S. Application Data

(62) Division of application No. 08/568,316, filed on Dec. 6, 1995, now Pat. No. 5,768,486.

(30) Foreign Application Priority Data

Dec. 8, 1994 (JP) .................................................. 6-304896
Nov. 24, 1995 (JP) .................................................. 7-305755

(51) Int. Cl.⁷ .................................................. G06F 15/00
(52) U.S. Cl. ...................... 358/1.16; 358/1.15; 358/1.17; 358/1.18; 382/41
(58) Field of Search .................................. 358/1.16, 1.17, 358/1.1, 1.15–1.18; 382/232, 41; 347/251

(56) References Cited

U.S. PATENT DOCUMENTS 5,500,928  3/1996  Cook et al. ............................ 395/133
5,917,947 * 6/1999  Ishida et al. .......................... 382/232

* cited by examiner

Primary Examiner—Jeffrey Gaffin
Assistant Examiner—Thanh Y. Tran
(74) Attorney, Agent, or Firm—Fitzpatrick, Cella, Harper & Scinto

(57) ABSTRACT

A printing apparatus includes a storing unit for executing a storing operation to store one page of intermediate data in a first memory. A determination unit determines, during the storing operation by the storing unit, whether the one page of intermediate data can be stored in the first memory. A control unit controls a data compression and storing operation such that if the determination unit determines that the one page of intermediate data cannot be stored in the first memory, (i) a portion of the one page of intermediate data that has already been stored in the first memory is compressed and stored in a second memory so as to expand a free space of the first memory, and (ii) a subsequent portion of the one page of intermediate data is compressed and stored in the second memory. A generation unit reads either one of the one page of intermediate data stored in the first memory and the one page of compressed intermediate data stored in the second memory and generates bit map data from the read intermediate data.

23 Claims, 11 Drawing Sheets

PRINTING APPARATUS

This application is a division of application Ser. No. 08/568,316 filed Dec. 6, 1995, now U.S. Pat. No. 5,768,486.

BACKGROUND OF THE INVENTION

1. Field of the Invention

The present invention relates to a printing apparatus, such as a laser beam printer, that generates bit map data from print data which are input from the outside and prints the data, and to a memory medium that is employed to store a control program.

2. Related Background Art

A page printer, such as a laser beam printer, must store an output image for one page in a bit map memory. To do this, there are a full paint method, which requires a full page bit map, and a banding method, by which a band bit map covering a fractional portion of a page is employed to generate an image for one page.

The full paint method requires a bit map memory for one page, and data to be printed are transferred to a printing mechanism (a printer engine) after an image is generated on a bit map memory. According to this method, for example, a bit map memory of about 8 MB is required for an A3 size sheet at a resolution of 600 DPI. However, since an output image for one page can be generated even for a great amount of data, or for data that require a long time for image generation, the print output of input data is ensured.

According to the banding method, data to be printed for one page are stored as intermediate data in the apparatus. A bit map memory for a fractional portion of a page is used as a ring buffer (band buffer), and the generation and the transfer of an output image must be controlled by employing a synchronization signal that is output by a printing mechanism (printer engine).

Compared with the full paint method, the banding method can be performed with a smaller memory capacity, and as the generation (rendering) of an output image and a transfer of the output image to the printing mechanism (printer engine) can be performed at the same time, the processing speed is increased.

Conventionally, in the full paint method, a bit map memory for one page is required, and in the banding method, a bit map memory for a fractional portion of a page is required. The capacity of a bit map memory, therefore, increases in proportion to the resolution of a printing apparatus and to the size of the sheet that can be handled.

Compared with the full paint method, the conventional banding method must store data for a single page that is to be printed as intermediate data in the apparatus. Therefore, when the intermediate data for one page can not be stored, printing can not be performed.

Further, an image must be generated and transferred in consonance with a synchronization signal from the printing mechanism (printer engine). However, because of the enormous amount of intermediate data, an output image can not be generated within a determined time period, an overrun occurs, and as a result, printing can not be performed.

As is described above, although the conventional banding method can reduce the memory capacity that is required for a bit map memory, with this method, print data that are input sometimes can not be output.

SUMMARY OF THE INVENTION

To overcome the above shortcomings, it is one object of the present invention to perform, for each band, an encoding process (encoding and compression) to generate encoded data from bit map data that are generated each time intermediate data for one page are stored; and to perform, for each band, a decoding process (decoding and decompression) to obtain data for one page from the encoded data that are stored, so that a time required for the generation of bit map data to be printed does not exceed a predetermined time, and so that bit map memory capacity may be reduced.

To overcome the above described shortcomings, it is another object of the present invention to manage, for each band, identification information that indicates whether or not a encoding process (coding and compression) has been performed for bit map data that are to be generated, and to perform a decoding process (decoding and decompression) for the bit map data in consonance with the identification information, so that a fast printing process is provided by efficient encoding decoding processes.

To resolve the above described shortcomings, it is an additional object of the present invention to determine whether or not a time period that is required for generating bit map data in consonance with intermediate data exceeds a predetermined period of time; and when the time period exceeds the predetermined time, to encode, compress and store bit map data for one page that have been generated based on the intermediate data for one page, so that the printing process for intermediate data is ensured.

To resolve the above described shortcomings, it is a further object of the present invention to determine whether or not intermediate data for one page can be stored in storage means, and when the intermediate data for one page can not be stored in the storage means, to encode, compress and store bit map data for one page that have been generated based on the intermediate data for one page, so that the printing process for the intermediate data is ensured.

To achieve the above described objects, a printing apparatus according to the present invention, which generates bit map data from intermediate data and prints the bit map data, comprises:

generation means for, when the intermediate data for one page are stored in first storage means, generating bit map data, for each band, from the intermediate data for one page, which are stored in the first storage means, for encoding and compressing the bit map data that are generated, and for generating encoded data for each band; and control means for, when the encoded data that are generated for each band by the generation means are stored in second storage means for one page, decoding and decompressing, for each band, the encoded data for one page, which are stored in the second storage means, and for reproducing bit map data for one page.

To achieve the above objects, a printing apparatus according to the present invention, which generates bit map data from intermediate data and prints the bit map data, comprises:

storage means for sorting and storing the intermediate data for each band;

encoding means for generating bit map data from the intermediate data that are stored in the storage means, and for encoding and compressing the bit map data that are generated;

management means for storing and managing, for each band, identification information that indicates whether or not the encoding means has performed a encoding process; and decoding means for decoding and decompressing the encoded data that are encoded and compressed by the encoding means to reproduce the bit map data; and control means for controlling the decoding means in consonance with the identification information that is stored and managed by the management means.

To achieve the above objects, a printing apparatus according to the present invention, which generates bit map data from intermediate data to print the bit map data, comprises:

determination means for determining, for each band, whether or not a time period for generation of bit map data based on the intermediate data exceeds a predetermined time period; and compression means for, when the determination means determines that the time period for generation exceeds the predetermined time period, encoding and compressing the bit map data for one page that have been generated based on the intermediate data for one page.

To achieve the above objects, a printing apparatus according to the present invention, which generates bit map data from intermediate data and prints the bit map data, comprises:

determination means for determining whether or not storage means is available for storing the intermediate data for one page; and compression means for, when the determination means determines that the storage means is not available for storing intermediate data for one page, encoding and compressing the bit map data for one page that have been generated based on the intermediate data for one page.

To achieve the above described objects, provided is a memory medium according to the present invention, which is employed by a printing apparatus that generates bit map data from intermediate data and that prints the bit map data, wherein is stored a program for, when the intermediate data are stored for one page in first storage means, generating bit map data for each band from the intermediate data for one page, which are stored in the first storage means, for encoding and compressing the bit map data that are generated to provide encoded data for each band, and for, when the encoded data that are generated for each band are stored for one page in second storage means, decoding and decompressing the encoded data for one page, which are stored in the second storage means, to reproduce the bit map data for one page.

To achieve the above objects, a memory medium according to the present invention, which is employed by a printing apparatus that generates bit map data from intermediate data and prints the bit map data, wherein is stored a program for sorting the intermediate data for a band, for generating bit map data by employing the intermediate data, which are stored in storage means, and for encoding and compressing the bit map data, for storing and managing, for each band, identification information that indicates whether or not the encoding means has been operated, and for employing the identification information that is stored and managed to determine whether or not the encoded data that are encoded and compressed are to be decoded and decompressed in order to reproduce the bit map data.

To achieve the above described objects, a memory medium according to the present invention, which is employed by a printing apparatus that generates bit map data from intermediate data and that prints the bit map data, wherein is stored a program for determining, for each band, whether or not a time period for generation of the bit map data based on the intermediate data exceeds a predetermined time period, and for, when the time period for generation exceeds the predetermined time period, encoding and compressing the bit map data for one page that have been generated based on the intermediate data for one page.

To achieve the above described objects, a memory medium according to the present invention, which is employed by a printing apparatus that generates bit map data from intermediate data and prints the bit map data, wherein is stored a program for determining whether or not the storage means is available for storing the intermediate data for one page, when as a result of determination it is ascertained that the storage means is not available for storing the intermediate data for one page, for encoding and compressing the bit map data for one page that have been generated based on the intermediate data for one page.

DESCRIPTION OF THE PREFERRED EMBODIMENTS

Before describing the arrangement for one embodiment of the present invention, the arrangement of a preferable laser beam printer (page printer) to which this embodiment is applied will be explained while referring to FIG. 1.

The printers that can be employed for this embodiment are not limited to laser beam printers, and may be other kinds of printers, such as ink-jet printers.

Figure 1:
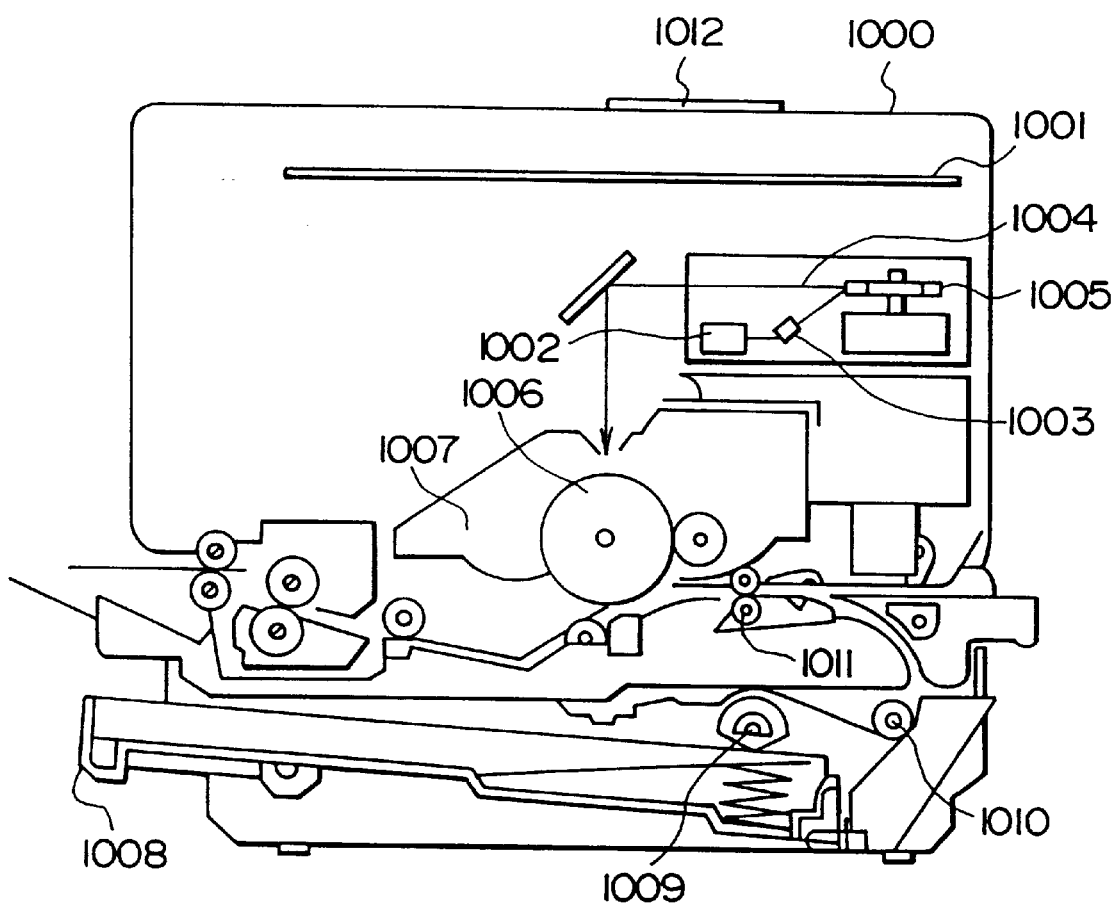
FIG. 1 is a cross sectional view of the arrangement of a first output apparatus for which the present invention can be applied.

FIG. 1 is a cross sectional view illustrating the arrangement of a first output apparatus, for example, a laser beam printer (LBP), for which the present invention can be applied.

An LBP main body 1000 receives print data (in a printer language, such as a page description language that consists of character codes and control codes), which are supplied from a host computer that is externally connected, and forms information or macro commands and stores them. In consonance with these received data, the LBP prepares corresponding bit map data, such as a character pattern or a form pattern, and forms an image on a recording sheet, which is a recording medium. On an operation panel 1012 are provided switches for manipulation, an LED display, etc. A printer control unit 1001 controls the entire LBP main body 1000 and analyzes print data that are supplied from the host computer.

The printer control unit 1001 mainly converts character data (character codes) into video signals for a corresponding character pattern, and outputs the pattern to a laser driver 1002.

The laser driver 1002 drives a semiconductor laser 1003, and in consonance with the received video signal, it switches on and off a laser beam 1004 that is emitted by the semiconductor laser 1003.

The laser beam 1004 runs to the right and to the left by a rotary multi-plane mirror 1005 and is employed to scan an electrostatic drum 1006.

As a result, an electrostatic latent image of a character pattern is formed on the electrostatic drum 1006. This latent image is developed by a developing unit 1007, which is partially fitted around the circumference of the electrostatic drum 1006, and is transferred to a recording sheet.

A cut sheet is employed as the recording sheet. The cut sheets are stored in a paper cassette 1008 that is attached to the LBP main body 1000, and are fed inside the apparatus to the electrostatic drum 1006 by a feed roller 1009 and delivery rollers 1010 and 1011.

The LBP main body 1000 has a card slot (not shown), so that, in addition to the incorporated fonts, an optional font card and a control card (emulation card) for different printer languages can be connected to the apparatus.

Figure 2:
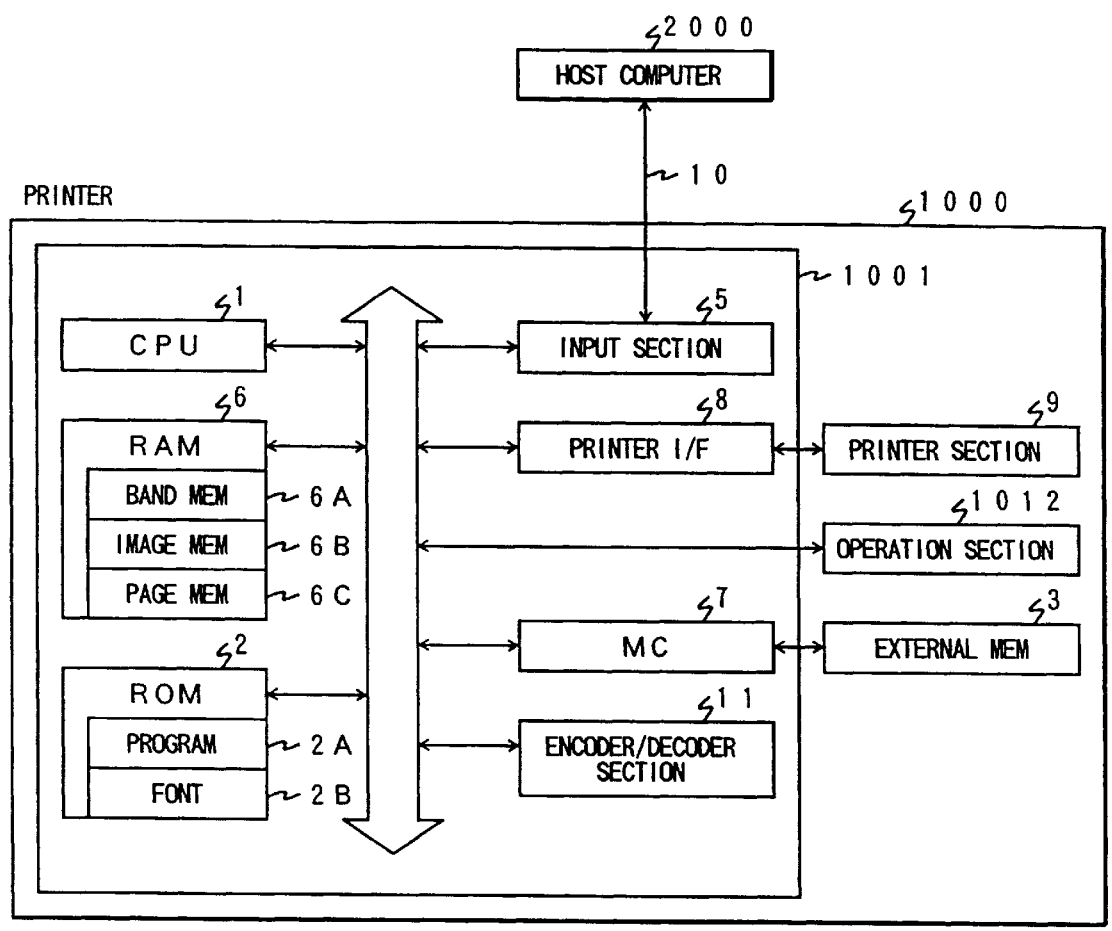
FIG. 2 is a block diagram for explaining the arrangement of a printer control system according to one embodiment of the present invention.

FIG. 2 is a block diagram for explaining the arrangement of a printer control system according to one embodiment of the present invention. A laser beam printer (FIG. 1) is employed for the explanation.

As long as the function of the present invention is accomplished, the present invention can be employed for a single apparatus, a system that includes a plurality of apparatuses, or a system that performs processing via a network, such as a LAN.

In FIG. 2, a host computer 2000 is connected to the printer control unit 1001 by a predetermined interface 10 (for example, a bi-directional interface) and performs communication control for the printer 1000.

In the printer control unit 1001 in consonance with a control program that is stored in a program ROM 2A of a ROM 2 or in an external memory 3, a CPU 1 totally controls the access of individual devices that are connected to a system bus 4. The CPU 1 also outputs image signals as output information to a printing section (printer engine) 9 that is connected to the CPU 1 via a printing interface 8.

In the program ROM 2A of the ROM 2 are stored a control program for the CPU 1, an image generation program for generating bit map data that are to be transferred to the printing section 9, etc., that correspond to the flowcharts in FIGS. 3 through 11, which will be described later.

In a font ROM 2B of the ROM 2 are stored font data (dot font data or outline font data) that are employed to generate the output image, or the like.

The CPU 1 can communicate with the host computer 2000 via an input section 5. A RAM 6 serves as a main memory, a work area, etc., for the CPU 1. Its memory can be expanded by an optional RAM that is connected to an expansion port (not shown).

The RAM 6 is employed as a page buffer memory 6C wherein input print data are stored as intermediate data (print data that are so processed as to easily generate bit map data), as a band buffer memory 6A of a band buffer size wherein bit map data are developed, and as an image memory 6B wherein encoded image data are stored. The capacities of the page buffer memory 6C, the band buffer memory 6A and the image memory 6B in the RAM 6 are dynamically variable.

An encoder section 11 encodes bit map data that are developed in the band buffer memory 6A in the RAM 6. The image data that have been encoded in consonance with the image generation program are stored in the image memory 6B in the RAM 6.

The accessing of the previously described external memory 3, such as a hard disk or an IC card, is controlled by a memory controller (MC) 7. The external memory 3 is connected as an optional device and stores font data, an emulation program, form data, etc.

On the operation panel 1012 are provided switches for manipulation and an LED display device, as was previously described.

The external memory is not limited to one unit. In addition to the incorporated fonts, a plurality of option font cards or external memories, wherein are stored programs that interpret different printer control languages, may be connected.

An NVRAM (not shown) may be included to store printer mode set information that is transmitted from the operation panel 1012.

In the thus arranged printer control system, character codes in print data that are input from the host computer 2000 are sorted for each band position that corresponds to each print position, which is instructed by a print data control code, and are stored as intermediate data in the page buffer memory 6C in the RAM 6.

When the intermediate data for one page have been stored, bit map data are generated, for each band size, in the band buffer memory 6A, and are encoded by the encoder section 11. Then, the encoded data are stored in the image memory 6B in the RAM 6.

When the encoded image data for one page have been stored, the decoder section 11 (for decoding and decompression) reproduces bit map data from the encoded image data, while the bit map data that form an image are converted into video signals by the printer I/F 8. The video signals are output to the printer section 9 and recorded on a recording sheet.

The print data that have been employed in this embodiment are for a printer language, such as a page description language.

The band buffer memory 6A and the band buffer size, which are explained in this embodiment, are, for example, 1/n (n=2, 3, 4, . . . ) of the memory size for a single A4 size page.

[First Embodiment]

Figure 3:
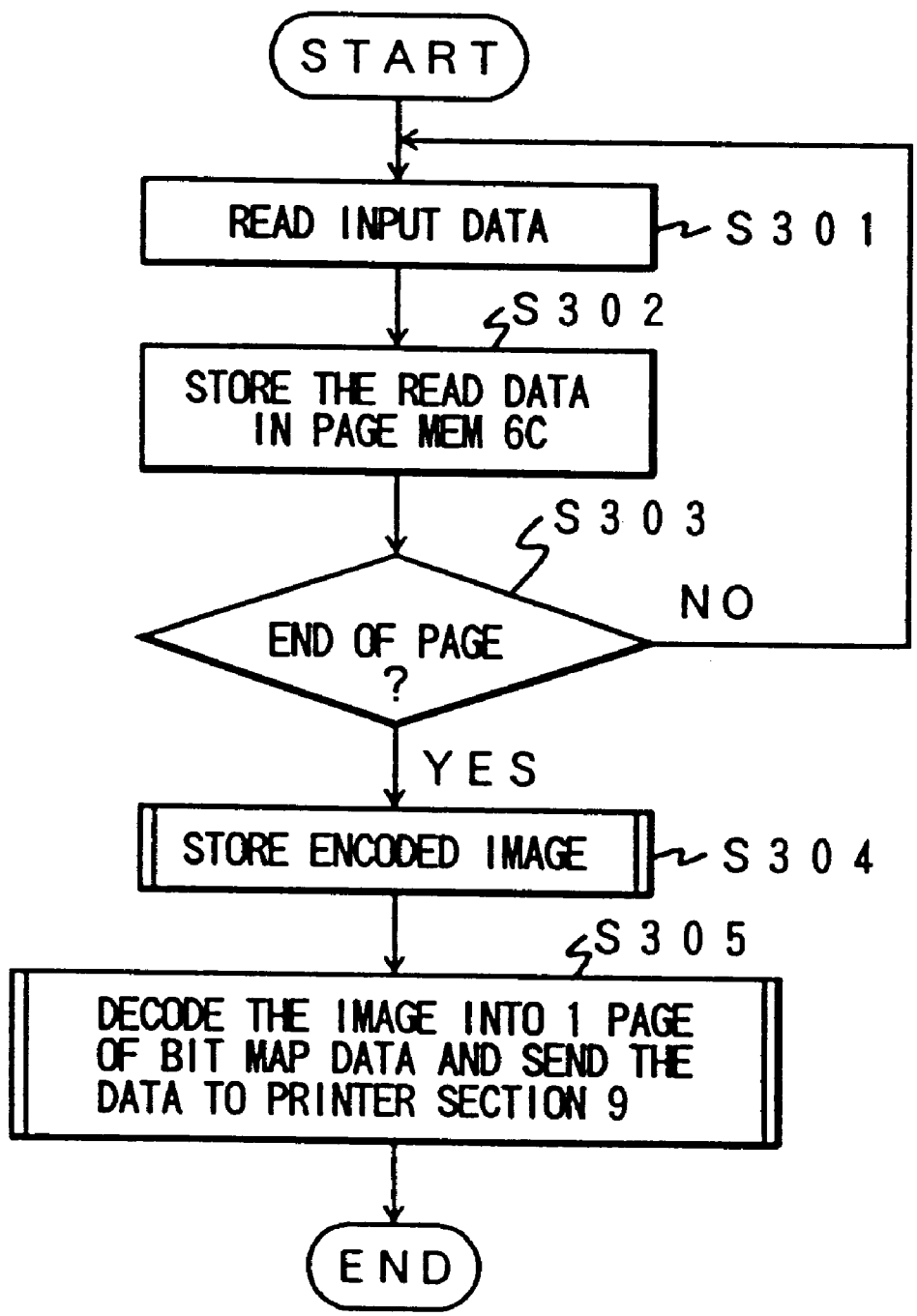
FIG. 3 is a flowchart showing an example for image generation processing with a printing apparatus according to a first embodiment of the present invention.

FIG. 3 is a flowchart showing the image generation processing for a printing apparatus according to a first embodiment of the present invention.

The program that corresponds to the flowchart in FIG. 3 is stored in a program area of the ROM 2, or in an external memory 3, and is executed by the CPU 1.

The CPU 1 reads print data (control codes that indicate printing positions or character codes) that are transmitted from the host computer 2000 (step S301) via the input section 5. The print data are sorted for each band (band buffer size), which corresponds to a printing position that is designated by the control code (a printing position that is designated for each object), and the sorted data are stored as intermediate data in the page buffer memory 6C of the RAM 6 (step S302).

At step S302, the print data are stored as intermediate data for the same page until a page end code, such as a page break command (a control code), is encountered among the print data. Whether or not the intermediate data for one page have been stored is determined by the detection of a page end code, such as a page break command (step S303).

If, at step S303, it is determined that the intermediate data for one page has been stored, the encoder section 11 performs an encoded image storage process with the intermediate data that are stored in the page buffer memory 6C (step S304). Then, the decoder section (for decoding and decompression) 11, which will be described later, performs a decoding process (decoding and decompression) with the encoded image data, recovers the bit map data for one page, and transfers the data to the printer section 9 (step S305).

Figure 4:
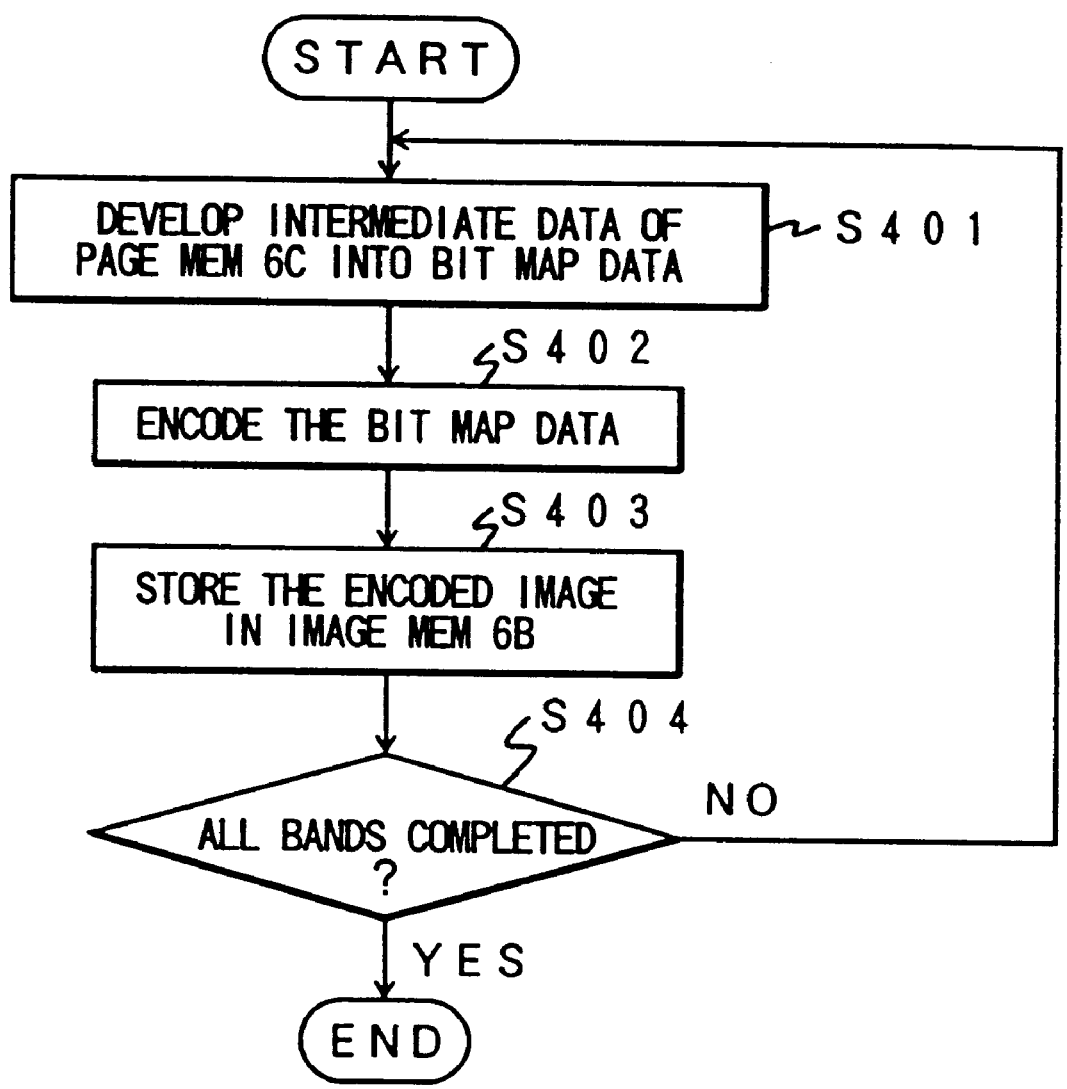
FIG. 4 is a flowchart showing an example for encoded image storage processing with the printing apparatus according to the first embodiment of the present invention.

FIG. 4 is a detailed flowchart for explaining the process at step S304 of the encoded image storage process in the first embodiment.

A program that corresponds to the flowchart in FIG. 4 is stored, for example, in a program area of the ROM 2, or in the external memory 3, and is executed by the CPU 1.

When, at step S303 in FIG. 3, the intermediate data for one page have been stored, intermediate data that are stored in the page buffer memory 6C, and that correspond to a target band position, are read out, and bit map data are generated in the band buffer memory 6A of the RAM 6 (step S401).

The generated bit map data are encoded and compressed by the encoder section 11 to produce encoded image data (step S402), which are stored in the encoded image data memory 6B in the RAM 6 (step S403). This process is performed for all the bands that constitute a single page. A check is then performed to determine whether or not encoded image data for a single page have been stored (step S404).

When, at step S404, it is determined that the encoded image data for a single page have been stored, the process at step S305 is performed. When the encoded image data have not yet been stored for one page, the process at step S401 is performed.

Figure 5:
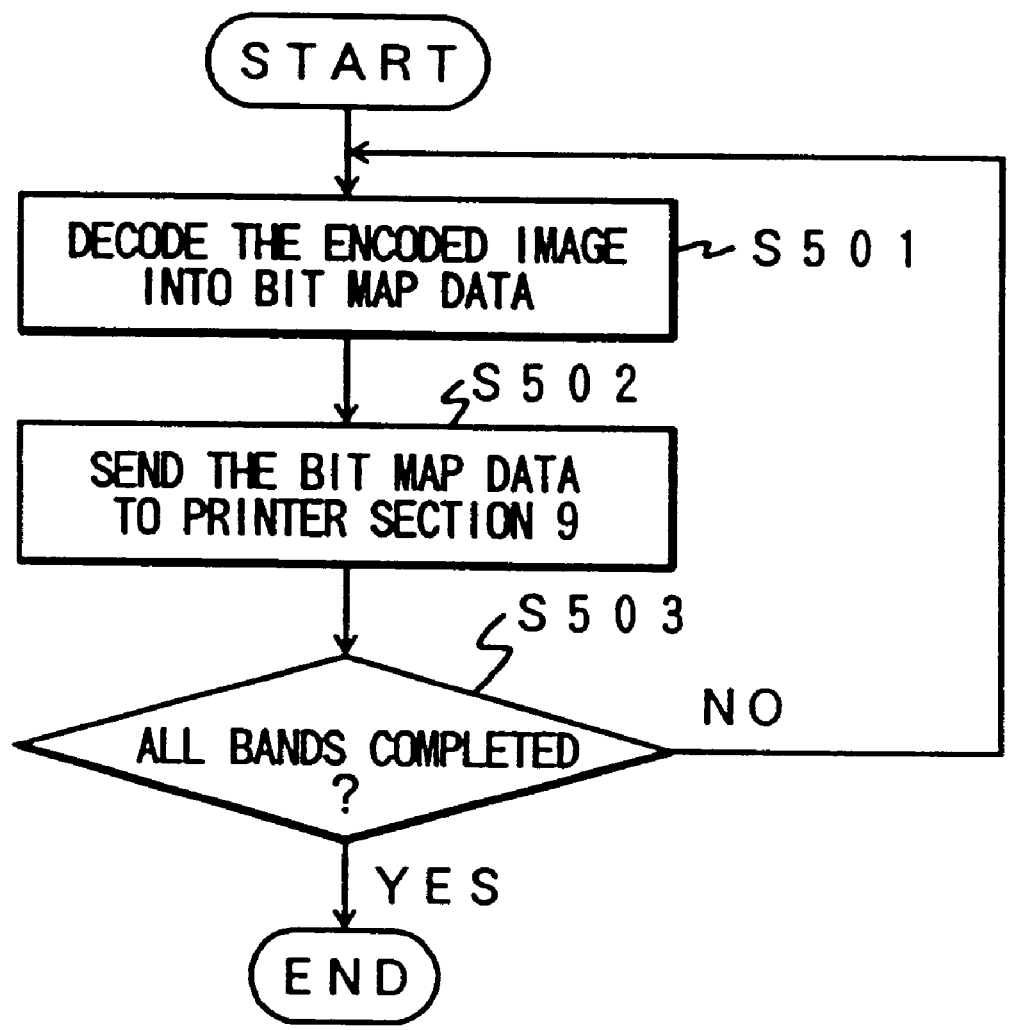
FIG. 5 is a flowchart showing an example for image storage processing with the printing apparatus according to the first embodiment of the present invention.

FIG. 5 is a detailed flowchart for the decoding (decoding and decompression) and the image transfer process at step S305 in the first embodiment.

A program that corresponds to the flowchart in FIG. 5 is stored in, for example, a program area of the ROM 2, or in the external memory 3, and is executed by the CPU 1.

If, at step S404 in FIG. 4, the encoded image data for one page have been stored, the decoder (decoding and decompression) section 11 sequentially decodes and decompresses, for each band, the encoded image data for one page, and reproduces the bit map data (step S501). The bit map data are then converted into video signals by the printer section I/F 8, and the video signals are transmitted to the printer section 9 (step S502).

A check is then performed to determine whether or not the bit map data for one page (for all the bands) have been transferred to the printer section 9 (step S503). When the bit map data that correspond to one page (all the bands) have not been transferred, the process at step S501 is repeated.

Although in this embodiment the image data memory 6B and the page buffer memory 6C are located in the RAM 6, their positioning is not limited to that location. For example, they may be located in the external memory 3 that is controlled by the MC 7.

In addition, although in this explanation, after the encoded image data for one page have been stored the data for that page are decoded and decompressed and the resultant data are transferred to the printer section, the process is not thereby limited. For example, the encoded image storage process at steps S301 through S304 may be repetitively performed for a plurality of pages, the encoded image data for a plurality of pages may be stored in the image data memory 6B, and the process at step S305 may be performed in order and in consonance with the processing speed of the printer section 9.

As is described above, in this embodiment, each time the print data that are input externally are stored as intermediate data for one page, bit map data are generated for each band. The encoding process (encoding and compression) is performed with the bit map data to produce encoded data. Each time after the encoded data for one page have been stored, the decoding process (decoding and decompression) is performed for each band, so that a time period for generation of the bit map data to be printed does not exceed a predetermined time period, and so that the bit map memory capacity can be reduced.

[Second Embodiment]

Figure 6:
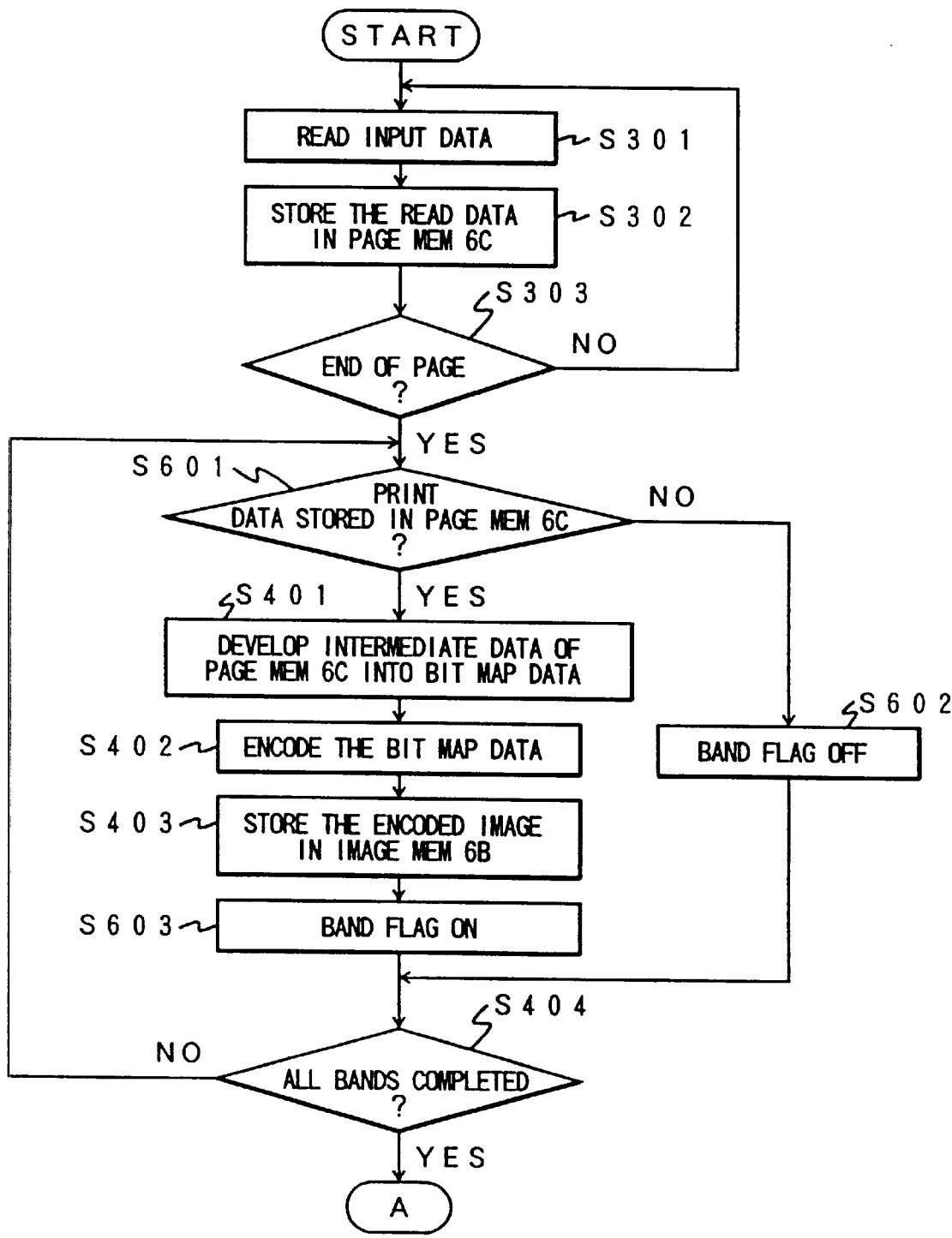
FIG. 6 is a flowchart showing an example for image generation processing with a printing apparatus according to a second embodiment of the present invention.
Figure 7:
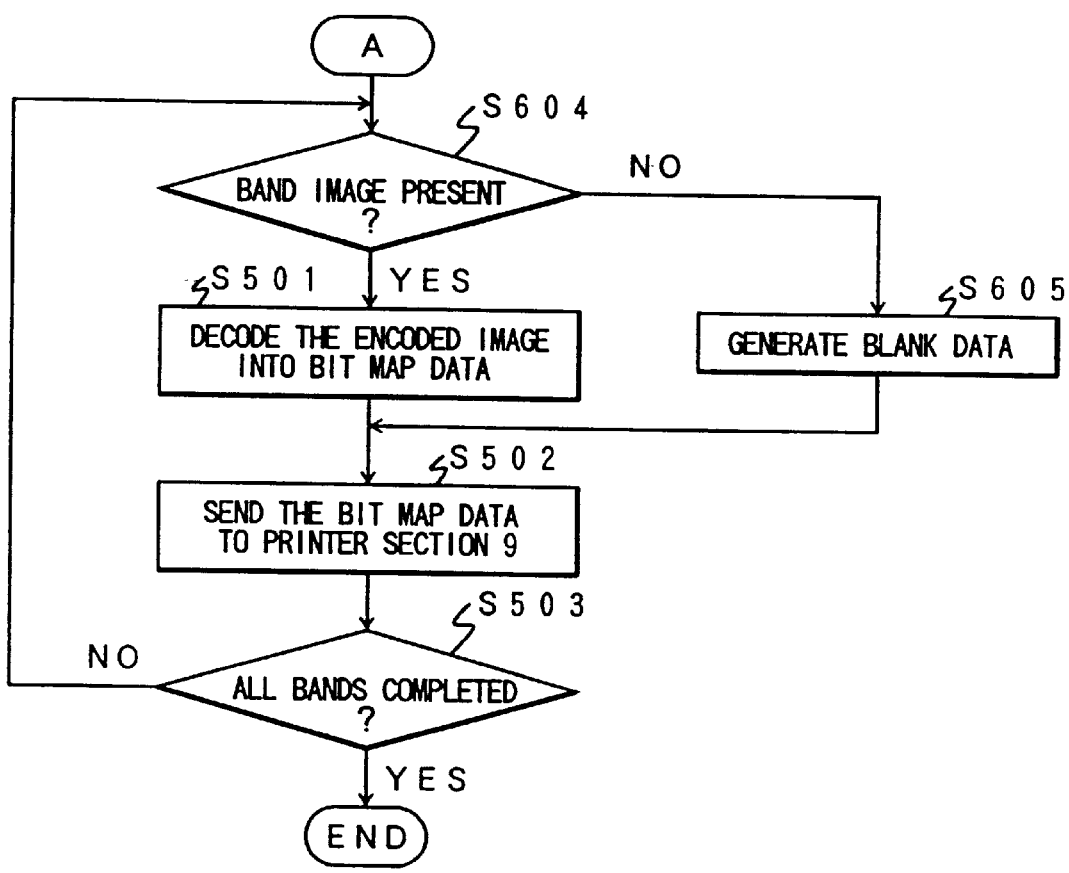
FIG. 7 is a flowchart showing an example for image generation processing with a printing apparatus according to the second embodiment of the present invention.

FIGS. 6 and 7 are flowcharts showing the image generation processing for a printing apparatus according to a second embodiment of the present invention. The same numbers as are used in the first embodiment are also used to denote steps whereat processes that are identical to those in the first embodiment are performed.

A program shown in the flowcharts in FIGS. 6 and 7 is stored in a program area of the ROM 2, or an external memory 3, and is executed by the CPU 1.

The CPU 1 reads print data (control codes that indicate printing positions or character codes) that are transmitted via the input section 5 from the host computer 2000 (step S301). The print data are sorted for each band, which corresponds to a printing position that is designated by the control code (a printing position that is designated for each object), and the sorted data are stored as intermediate data in the page buffer memory 6C of the RAM 6 (step S302).

At step S302, the print data are stored as intermediate data for the same page until a page end code, such as a page break command (control code), is encountered among the print data. Whether or not the intermediate data for one page has been stored is determined by the detection of a page end code, such as a page break command (step S303).

When, at step S303, the intermediate data for one page have been stored, a check is performed to determine whether or not print data that correspond to a target band are stored in the page buffer 6C (step S601). If desired intermediate data are not stored and it is not necessary to generate bit map data, a band flag, for a target band in a band image data table (not shown) in the RAM 6, that is provided for each page is set to OFF (step S602). Thereafter, the following process at step S404 is performed.

If, at step S601, the intermediate data that correspond to a band to be generated are stored, the intermediate data that are stored in the page buffer memory 6C and that correspond to a target band position are read out, and bit map data are generated in the band buffer memory 6A in the RAM 6 (step S401).

The generated bit map data are encoded and compressed by the encoder section 11 to produce encoded image data (step S402), which is stored in the encoded image data memory 6B in the RAM 6 (step S403). At the same time, the band flag for the pertinent band in the band data table is set to ON (step S603).

This process is performed for all the bands that constitute a single page. A check is then performed to determine whether or not encoded image data for a single page have been stored (step S404).

When, at step S404, the encoded image data for one page have been stored, the process at step S604 in FIG. 7 is performed. When the encoded image data for one page have not yet been stored, the process at step S601 is performed.

If, at step S404, the encoded image data for one page have been stored, the band flag in the band image data table is examined to in order to determine whether or not there are band image data that are to be output (step S604).

When, at step S604, the band flag of a desired band is set to ON (there are image data for the band), the decoder (decoding and decompression) section 11 sequentially decodes and decompresses the encoded image data for the desired band, which are stored in the encoded image data memory 6B in the RAM 6, and reproduces bit map data. The bit map data are converted into video signals by the printer I/F 8 and the video signals are transferred to the printer section 9 (step S502).

If, at step S604, the band flag for a desired band is set to OFF (there are no image data for that band), blank bit map data (for example, Os) are produced (step S605), and the previously mentioned process at step S502 is performed.

A check is then performed to determine whether or not the bit map data for one page (for all the bands) have been transferred to the printer section 9 (step S503). When the bit map data that correspond to one page (all the bands) have not been transferred, the process at step S604 is performed.

Although in this embodiment the image data memory 6B and the page buffer memory 6C are located in the RAM 6, their positioning is not limited to that location. For example, they may be located in the external memory 3 that is controlled by the MC 7.

In addition, although after the encoded image data for one page have been stored the data for that page are decoded and decompressed and the resultant data are transferred to the printer section, the process is not thereby limited. For example, the encoded image storage process that has been explained while referring to FIG. 6 may be repetitively performed for a plurality of pages, the encoded image data for a plurality of pages may be stored in the image data memory 6B, and the process that has been explained while referring to FIG. 7 may be performed in order and in consonance with the processing speed of the printer section 9.

Although the band flags that indicate whether or not there are image data for specific bands are provided in the band image data table, the flags that may be used are not limited to this type. For example, encoding flags may be provided, and if the capacity of the memory 6B increases when the bit map data are to be encoded, whether or not the encoding process should be performed may be determined for each band.

In addition, a plurality of encoding means are provided, and an encoding means that is the most appropriate for the bit map data that are produced may be selected for each band.

As is described above, in this embodiment, the identification information that indicates whether or not a encoding process (encoding and compression) has been performed for bit map data that are to be generated is managed for each band, and a decoding process (decoding and decompression) is performed in consonance with the identification information, so that a fast printing process is provided by efficient encoding decoding processes.

[Third Embodiment]

Figure 8:
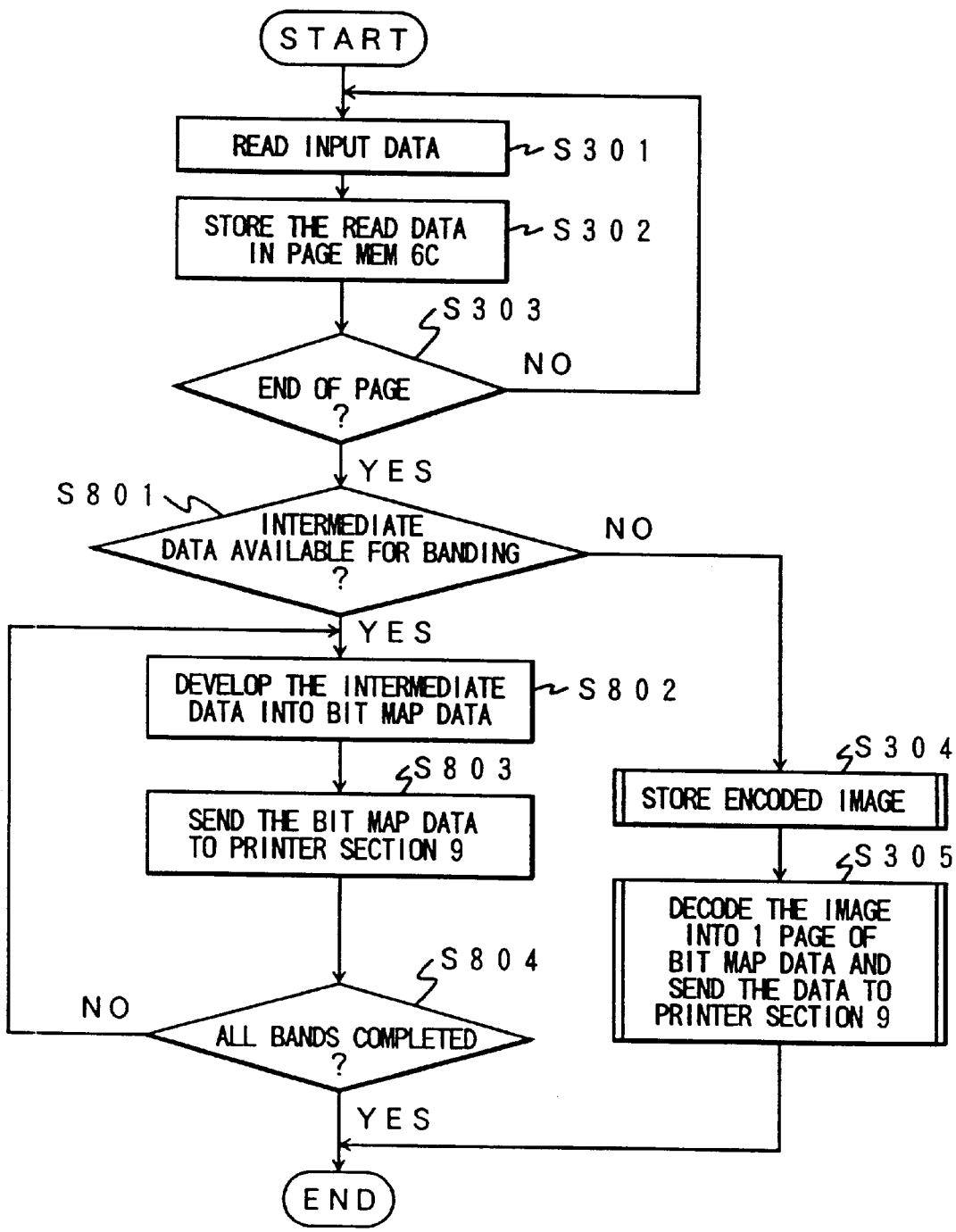
FIG. 8 is a flowchart showing an example for image generation processing with a printing apparatus according to a third embodiment of the present invention.

FIG. 8 is a flowchart showing the image generation processing for a printing apparatus according to a third embodiment of the present invention. The same numbers as are used in the first embodiment are also used to denote steps where processes are performed that are identical to those in the first embodiment.

In the following embodiment, the band buffer memory 6A consists of a band buffer memory 1 and a band buffer memory 2.

A program that corresponds to the flowchart in FIG. 8 is stored in a program area of the ROM 2, or an external memory 3, and is executed by the CPU 1.

The CPU 1 reads print data (control codes that indicate printing positions or character codes) that are transmitted via the input section 5 from the host computer 2000 (step S301). The print data are sorted for each band, which corresponds to a printing position that is designated by the control code (a printing position that is designated for each object), and the sorted data are stored as intermediate data in the page buffer memory 6C of the RAM 6 (step S302).

At step S302, the print data are stored as intermediate data for the same page until a page end code, such as a page break command (control code), is encountered among the print data. Whether or not the intermediate data for one page has been stored is determined by the detection of a page end code, such as a page break command (step S303).

When, at step S303, the intermediate data for one page have been stored, a check is performed to determine whether or not the intermediate data that are stored in the page buffer memory 6C are available for banding (step S801).

The process at step S801 is for determining whether or not the data are available for banding.

First, the time required for developing print data for a target band into a bit map is calculated. Ordinarily, the number of print objects (characters, graphic figures, image data, etc.) that are included in the target band, and the attributes of the individual print objects (the size of a character, the size and appearance attributes of a character, the shape and size of a figure, etc.) are employed to estimate the development time for the pertinent band. For example, when a character is to be drawn, the development time for the character is determined by the character size and the selection of the size and appearance attributes. When a circle is to be drawn, the development speed for the circle is determined by the size of the circle and the thickness of the line.

In this manner, the sum of the development speeds of all the print objects that are included in the target band is employed as the anticipated time for the development of that segment.

The rotational speed of the printer engine of the printing apparatus is constant. Therefore, the transfer time for bit map data of each band to the printer engine is also constant. The development anticipated time for the band is compared with the transfer time for each band. When the development anticipated time is shorter than the transfer time, it is assumed that the intermediate data are available for banding, and the processing at step S802 and the following steps is performed. When the development anticipated time is longer than the transfer time (when an overrun occurs), it is assumed that the intermediate data are not available for banding, and the processing at step S304 and the following steps is performed.

When, at step S801, the intermediate data are available for the banding process, the intermediate data, which are stored in the page buffer that corresponds to the target band position, are read out, and bit map data are produced in the band buffer memory 1 of the band buffer memory 6A in the RAM 6 (step S802). The acquired bit map data in the band buffer memory 1 are transferred to the printer section 9 via the printer I/F 8 (step S803).

While the bit map data in the band buffer memory 1 are transferred to the printer section 9, a check is performed to determine whether or not the intermediate data for all the bands in an identical page have been developed into a bit map and transferred to the printer section 9 (all the bands have completed) (step S804).

If, at step S804, all the bands have not been completed, the intermediate data that are stored in the page buffer that corresponds to the succeeding band position are read out, and the bit map data are produced in the band buffer memory 2 of the band buffer memory 6A in the RAM 6 (step S802). When the bit map data in the band buffer memory 1 have been transferred, in consonance with a synchronization signal from the printer section 9, the bit map data that are generated in the band buffer memory 2 are transferred in the same manner as are the data in the band buffer memory 1 (step S803).

The intermediate data for one page that are stored in the page buffer are employed to generate and store bit map data alternately in the band buffer memories 1 and 2, and the bit map data are then sequentially transferred to the printer section 9.

When, at step S801, the banding process can not be performed, the process at step S304, which has been explained previously while referring to FIG. 4, is performed, and the process at step S305, which has been mentioned while referring to FIG. 5, is performed.

Although in this embodiment the image data memory 6B and the page buffer memory 6C are located in the RAM 6, their positioning is not limited to that location. For example, they may be located in the external memory 3 that is controlled by the MC 7.

Further, when the performance of the banding process is not possible, the encoded image data for one page are stored, then the data for that page are decoded and decompressed, and the resultant data are transferred to the printer section. However, the process is not thereby limited. For example, the encoded image storage process that has been explained while referring to FIG. 6 may be repetitively performed for a plurality of pages, the encoded image data for a plurality of pages may be stored in the image data memory 6B, and the process that has been explained while referring to FIG. 7 may be performed in order in consonance with the processing speed of the printer section 9.

In addition, although the encoded image data have been stored for each page when the banding process can not be performed, the process is not limited to this. For example, only a band for which the banding process can not be performed may be encoded and compressed.

As is described above, in this embodiment, a check is performed to determine whether or not externally received print data are available for banding. When the data are not available for the banding, the encoding process (encoding and compression) and the decoding process (decoding and decompression) are performed to ensure the printing of the received print data.

[Fourth embodiment]

Figure 9:
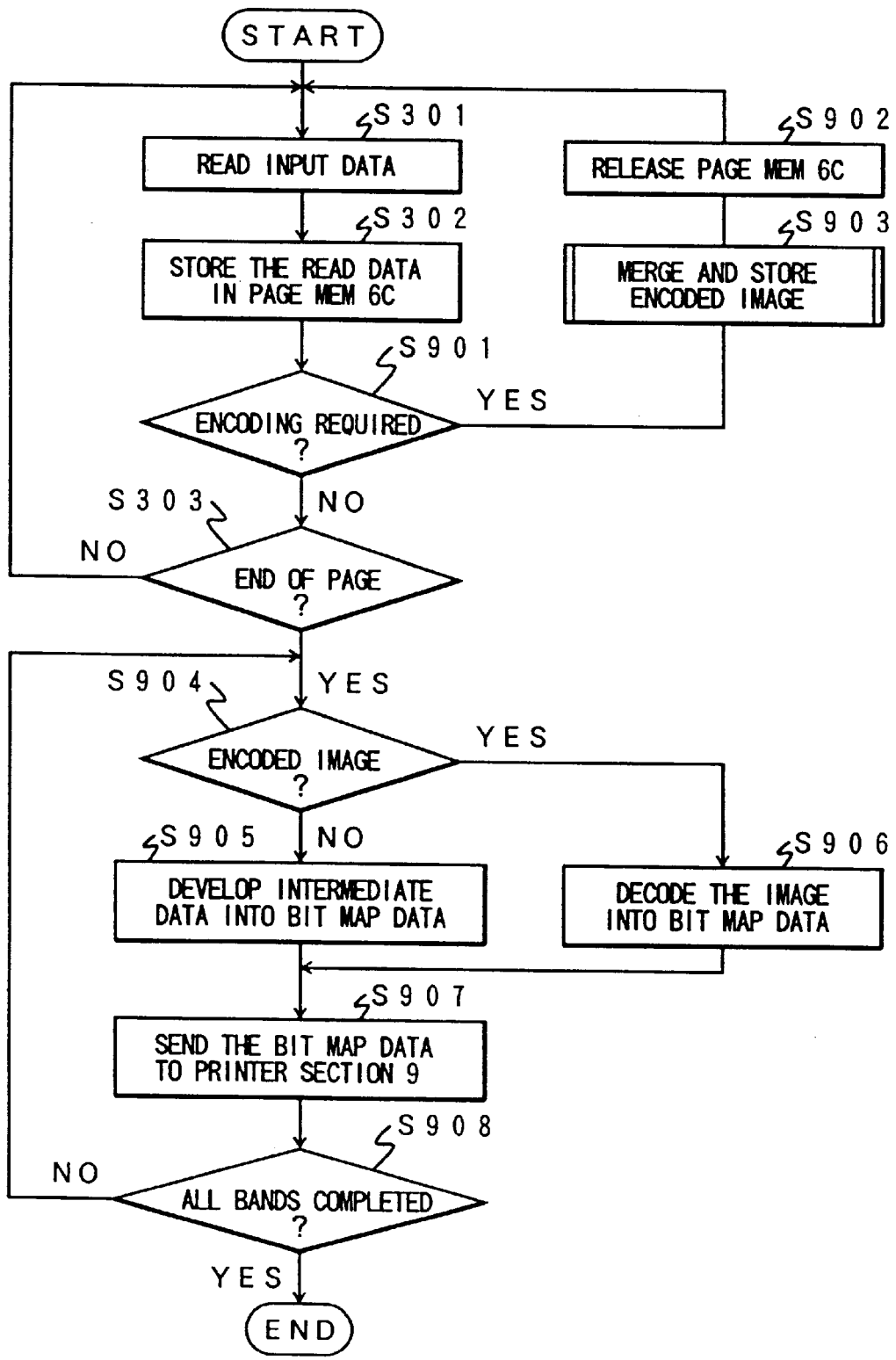
FIG. 9 is a flowchart showing an example for image generation processing with a printing apparatus according to the third embodiment of the present invention.
Figure 10:
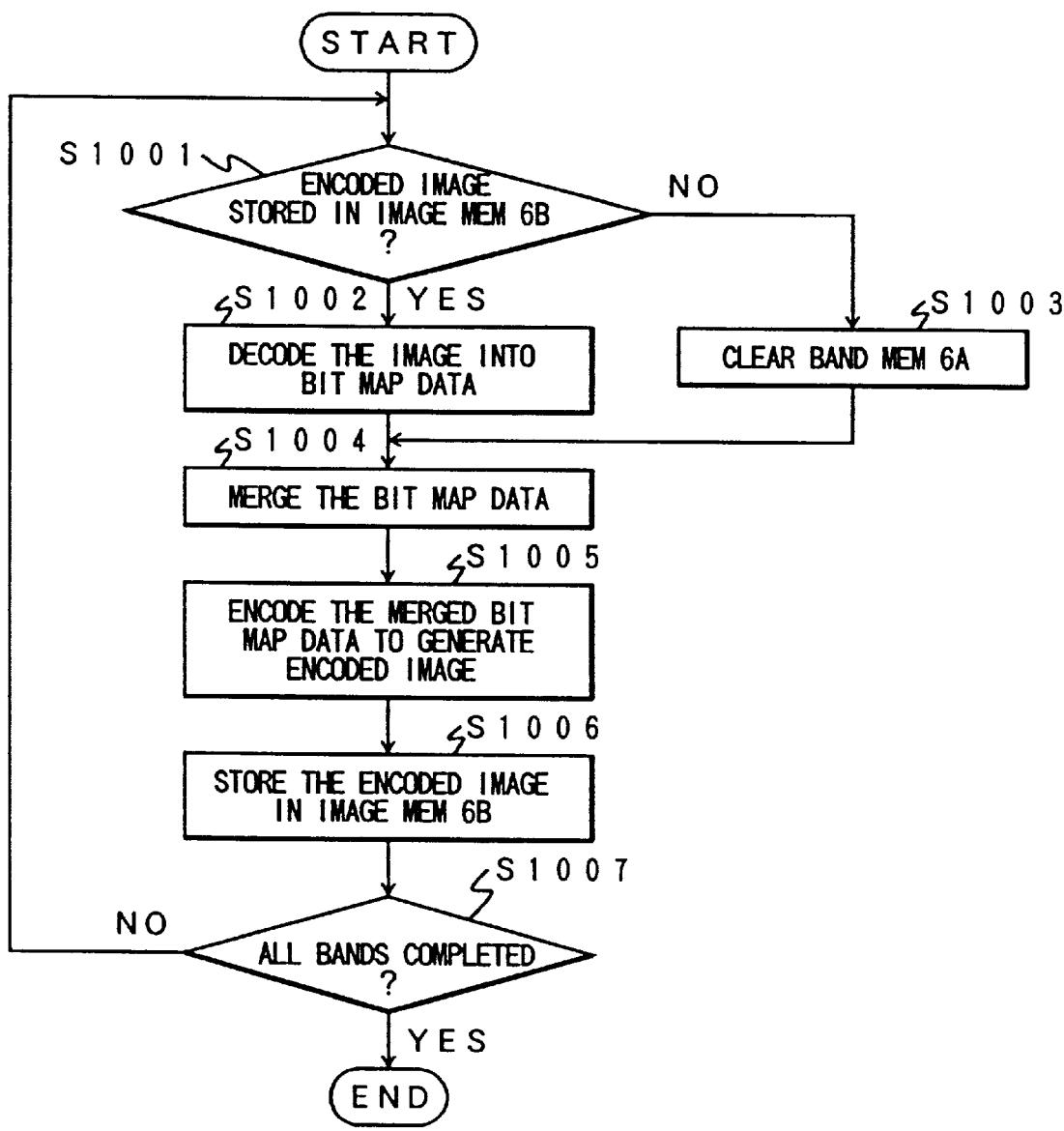
FIG. 10 is a flowchart showing an example for image generation processing with a printing apparatus according to a fourth embodiment of the present invention.

FIGS. 9 and 10 are flowcharts showing the image generation processing for a printing apparatus according to a fourth embodiment of the present invention. The same numbers as are used in the first embodiment are also used to denote steps where are performed processes that are identical to those in the first embodiment.

A program shown in the flowcharts in FIGS. 9 and 10 is stored in a program area of the ROM 2, or an external memory 3, and is executed by the CPU 1.

The CPU 1 reads print data (control codes that indicate printing positions or character codes) that are transmitted via the input section 5 from the host computer 2000 (step S301). The print data are sorted for each band, which corresponds to a printing position that is designated by the control code (a printing position that is designated for each object), and the sorted data are stored as intermediate data in the page buffer memory 6C of the RAM 6 (step S302).

At step S302, the print data are stored as intermediate data for the same page until a page end code, such as a page break command (control code), is encountered among the print data. A check is performed to determine whether or not the page buffer memory 6C is available for storing the intermediate data for one page (whether or not the encoding process is required) (step S901).

When, at step S901, the page buffer memory 6C is not available for storing the print data for one page as intermediate data (the encoding process is required), since the data are not available for banding, an encoded image data merging and storing process, which will be described later, is performed on the intermediate data that have been stored in the page buffer memory 6C (step S903). The bit map data that are based on the intermediate data that are stored in the page buffer memory 6C are encoded. The encoded data are stored in the image data memory 6B, and the page buffer memory 6C is released (step S902).

The remaining print data for one page (print data that can not be stored in the page buffer memory 6C) are read (step S301). The data are sorted for each band that corresponds to each designated print position and the sorted data are stored as intermediate data in the page buffer memory 6C (step S302). Since it has been determined that the encoding process is required, the encoded image merging and storing process is performed on the remaining intermediate data for one page, which are newly stored in the page buffer memory 6C (step S903). The bit map data that are based on the intermediate data, which are stored in the page buffer memory 6C, are encoded and stored in the image data memory 6B. Then, the page buffer memory 6C is released (step S902).

The above processes at the individual steps are repeated until the encoded image data for one page are stored in the image data memory 6B.

When, at step S901, the page buffer memory 6C is available for storing print data for one page as intermediate data (the encoding process is not required), a check is performed to determine whether or not the intermediate data for one page have been stored (step S303). When the storing of data have not been completed, the process at step S301 and the following steps is repeated until the storing of the intermediate data for one page is completed. When the storing of the intermediate data for one page has been completed, a check is performed to determine whether or not the data for a page to be processed are the encoded image data, which are stored in the image data memory 6B, or the intermediate data, which are stored in the page buffer memory 6C (step S904).

If, at step S904, the data for a page to be processed are determined to be the intermediate data that are stored in the page buffer memory 6C, the intermediate data that are stored in the page buffer memory 6C and that correspond to the target band position are read out. The intermediate data are developed into a bit map in the band buffer memory 1 of the band buffer memory 6A in the RAM 6 to produce bit map data (step S905). If, at step S904, the data for a page to be processed are determined to be the encoded image data that are stored in the image data memory 6B, the encoded image data for a target band is read out from the image memory 6B of the RAM 6. The encoded image data are decoded and decompressed by the decoder (decoding and decompression) section 11 to reproduce bit map data in the band buffer memory 1 of the band buffer memory 6A (step S906).

The acquired bit map data in the band buffer memory 1 of the band buffer memory 6A are transferred to the printer section 9 via the printer I/F 8 in consonance with a synchronization signal (step S907). During the transfer of the bit map data, a check is performed to determine whether or not there is a succeeding band on an identical page (whether or not all the bands have been completed) (step S908). When there is a succeeding band (when not all the bands have been completed), the above described process at step S904 and the following steps is performed, and the bit map data are generated in the band buffer memory 2 of the band buffer memory 6A in the RAM 6. When the transfer of the bit map data from the band buffer memory 6A has been completed, the bit map data that are produced in the band buffer memory 2 are transferred in consonance with a synchronization signal in the same manner as are the bit map data for the band buffer memory 1 (step S907).

In this manner, the above described process is repeated until the printing process for one page is completed.

FIG. 10 is a flowchart for explaining the encoded image merging and storing process at step S903 in the fourth embodiment.

When, at step S901 in FIG. 9, the memory is not available for storing the intermediate data for one page (when the encoding process is required), a check is performed to determine whether or not there are encoded image data that correspond to the target band position in the image memory 6B (step S1001). If there are encoded image data present in the memory 6B, the encoded image data are decoded and decompressed by the decoder (decoding and decompression) section 11, and the resultant data are developed into a bit map in the band buffer memory 6 to reproduce bit map data (step S1002).

If, at step S1001, there are no encoded image data for an identical band, the band buffer memory 6A is cleared (step S1003).

Then, the intermediate data are read from the page buffer memory 6C, and are developed into a bit map in the band buffer memory 6A to produce bit map data.

At this time, when, at step S1002, the data are decoded and decompressed and the resultant data are developed into a bit map, the bit map data are merged with the bit map data that are obtained by reading the intermediate data from the page buffer memory 6C and developing them (step S1004).

The merged bit map data are then encoded again and compressed by the encoder section 11 to produce encoded image data (step S1005). The encoded image data are re-stored in the image data memory 6B in the RAM 6 (step S1006).

This process is performed for all the bands that constitute one page, and repeated until the encoded image data for one page are stored (step S1007). After the encoded image data for one page have been produced, the process at step S902 in FIG. 9 is performed.

Although in this embodiment the image data memory 6B and the page buffer memory 6C are located in the RAM 6, their positioning is not limited to that location. For example, they may be located in the external memory 3 that is controlled by the MC 7.

Further, even though when the performance of the banding process is not possible (when the intermediate data for one page can not be stored in the page buffer memory 6C), the encoded image data for one page are stored, and then the data for that page are decoded and decompressed and the resultant data are transferred to the printer section, the process is not thereby limited. For example, the encoded image storage process that has been explained while referring to FIG. 10 may be repetitively performed for a plurality of pages, the encoded image data for a plurality of pages may be stored in the image data memory 6B, and the process that has been explained while referring to FIG. 7 may be performed in order and in consonance with the processing speed of the printer section 9.

Again, though encoded image data are stored for each page when the banding is not possible, the processing is not thereby limited. For example, only a band for which the banding is impossible may be encoded.

In the encoded image merging process at step S903, it is assumed that the banding is impossible because there is insufficient page buffer memory 6C. But the method is also not thereby limited. For example, the time (time factor) for generation of bit map data in the band buffer memory 6A from intermediate data in the page buffer memory 6C is estimated, and it may be determined that the banding is impossible because the bit map data can not be generated within a determined time period.

As is described above, in this embodiment, when the externally received print data for one page can not be stored as intermediate data for one page in the page buffer memory 6C, the encoding process (encoding and compression) is performed with bit map data for one page that are based on the intermediate data, and encoded data are generated in advance. Then, the decoding process (decoding and decompression) is performed to reproduce bit map data, which are transferred to the printer engine. When the intermediate data for one page can be stored in the page buffer memory 6C, the rendering is performed for each band to produce the bit map data, which are in turn transferred to the printer engine. In this manner, the printing process in consonance with the memory capacity can be performed.

[Fifth Embodiment]

Figure 11:
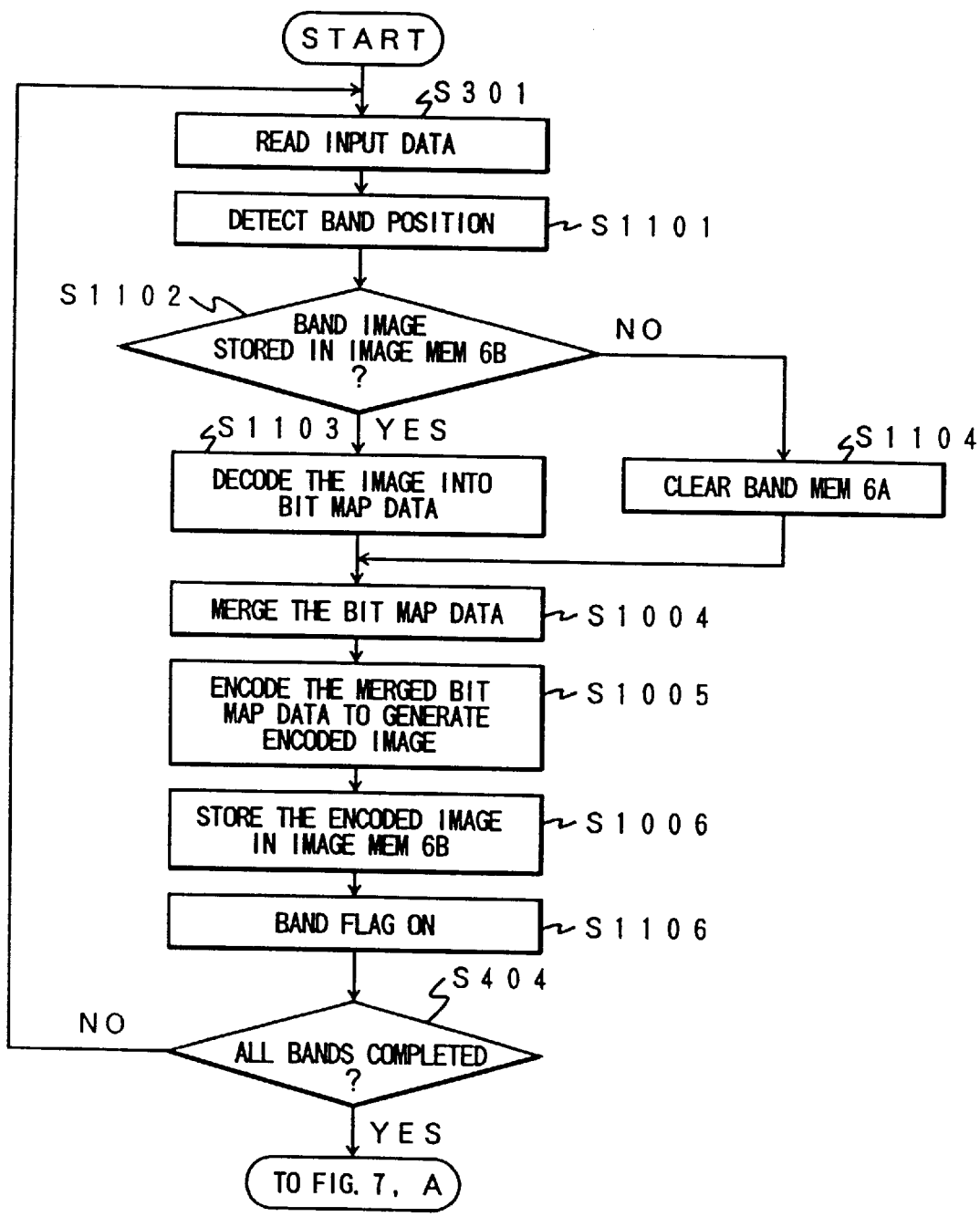
FIG. 11 is a flowchart showing an example of image generation means for a printing apparatus according to the fourth embodiment of the present invention.

FIG. 11 is a flowchart showing the image generation processing for a printing apparatus according to a fifth embodiment of the present invention. The same numbers as are used in the above embodiments are also used to denote steps where processes are performed that are identical to those in the first embodiment.

A program that corresponds to the flowchart in FIG. 11 is stored in a program area of the ROM 2, or an external memory 3, and is executed by the CPU 1.

The CPU 1 reads print data (control codes that indicate printing positions or character codes) that are transmitted via the input section 5 from the host computer 2000 (step S301). Band positions, which correspond to print positions that are designated by the read print data, are detected (step S1101). A check is performed to determine whether or not encoded image data at the detected band position are present in the image memory 6B of the RAM 6 by examining the band image data table (step S1102).

When, at step S1102, the encoded image data are stored in the image memory 6B, the encoded image data are decoded and decompressed by the decoder (decoding and decompression) section 11, and the resultant data are developed into a bit map in the band buffer memory 6 of the RAM 6 to reproduce bit map data (step S1103). If, at step S1102, encoded image data are not stored, the band buffer memory 6A is cleared (step S1104).

Then, the intermediate data that are read at step S301 are developed into a bit map in the band buffer memory 6A to produce bit map data. At this time, when, at step S1103, the data are decoded and decompressed and the resultant data are developed into a bit map, the bit map data that are obtained at step 1103 are merged with the bit map data that are obtained by reading the intermediate data at step S301 (step S1004).

The merged bit map data are then encoded again and compressed by the encoder section 11 to produce encoded image data (step S1005). The encoded image data are re-stored in the image data memory 6B in the RAM 6 (step S1006). Further, the pertinent band flag in the band data table is set to ON (step S1106).

A check is performed to determine whether or not this process is performed for all the print data for one page (step S404). When the encoded image data for a single page have been stored, as is explained while referring to FIG. 7, the encoded image data are read from the image memory 6B. The encoded image data are decoded and decompressed by the decoder (decoding and decompression) section 11 to reproduce the bit map data for one page. The bit map data are transferred to the printer section 9 to print the data.

At step S301, the print data that have been read from the host computer 2000 are processed for each object without being stored in the page buffer memory 6C. As in the previously described embodiments, the intermediate data for one page may first be stored in the page buffer memory 6C, and may be processed later for each band.

Although in this embodiment the image data memory 6B and the page buffer memory 6C are located in the RAM 6, their positioning is not limited to that location. For example, they may be located in the external memory 3 that is controlled by the MC 7.

In addition, although after the encoded image data for one page have been stored the data for that page are decoded and decompressed and the resultant data are transferred to the printer section, the process is thereby not limited. For example, the encoded image storage process that has been explained while referring to FIG. 6 may be repetitively performed for a plurality of pages, the encoded image data for a plurality of pages may be stored in the image data memory 6B, and the process that has been explained while referring to FIG. 7 may be performed in order and in consonance with the processing speed of the printer section 9.

Although the band flags that indicate whether or not there are image data for specific bands are provided in the band image data table, the flag is not limited to this type. For example, an encoding flag may be provided, and if the capacity of the memory 6B increases when the bit map data are to be encoded, whether or not the encoding process should be performed may be determined for each band.

In addition, a plurality of encoding means are provided, and an encoding means that is the most appropriate for the bit map data that are produced may be selected for each band.

As is described above, according to the present invention, the encoding process (encoding and compression) is performed with externally received print data to generate encoded data. The bit map data, which are reproduced by performing the decoding process (decoding and decompression) with the encoded data, and the bit map data, which are produced by using other print data, are merged. As a result, the capacity of the bit map memory can be reduced.

What is claimed is:

1. A printing apparatus, which generates bit map data from intermediate data and prints said bit map data, comprising:
   a storing unit for executing a storing operation to store one page of intermediate data in a first memory;
   a determination unit for determining, during the storing operation by said storing unit, whether the one page of intermediate data can be stored in the first memory;
   a control unit for controlling a data compression and storing operation such that if said determination unit determines that the one page of intermediate data cannot be stored in the first memory, (i) a portion of the one page of intermediate data, which portion has already been stored in the first memory, is compressed and stored in a second memory so as to expand a free space of the first memory, and (ii) a subsequent portion of the one page of intermediate data is compressed and stored in the second memory; and
   a generation unit for reading either one of the one page of intermediate data stored in the first memory and the one page of compressed intermediate data stored in the second memory and generating bit map data from the read intermediate data.

2. A printing apparatus according to claim 1, wherein said determination unit executes a determination for a band unit.

3. A printing apparatus which generates bit map data from intermediate data to print the bit map data, comprising:
   a determination unit for determining, for each band, whether a time period for generation of bit map data based on intermediate data for the band exceeds a predetermined time period;
   a compression unit for selecting at least one band for which said determination unit determines that the time period for generation exceeds the predetermined time period, and for generating bit map data based on the intermediate data of the selected band and then compressing the generated bit map data; and
   a generation unit for generating one page of bit map data based on one page of data comprising at least one band of intermediate data mixed with at least one band of compressed bit map data.

4. A printing apparatus according to claim 3, further comprising control means for performing control so that, for each band for which said determination unit determines that the time period for generation does not exceed said predetermined time period, bit map data is generated that is based on said intermediate data for said band, in synchronization with reading of said bit map data.

5. A printing apparatus according to claim 3, wherein said determination means compares a time period for generation of said bit map data from said intermediate data for said band with a time period for transferring said bit map data to a printer engine.

6. A printing apparatus according to claim 3, further comprising decompression means for decompressing said data for one page, which are compressed in advance by said compression means, in synchronization with reading of said bit map data to reproduce said bit map data.

7. A memory medium, which is employed by a printing apparatus that generates bit map data from intermediate data and that prints the bit map data, wherein is stored a program for executing a storing operation to store one page of intermediate data in a first memory;

determining, during the storing operation in the storing step, whether the one page of intermediate data can be stored in the first memory;

controlling a data compression and storing operation such that if said determinating step determines that the one page of intermediate data cannot be stored in the first memory, (i) a portion of the one page of intermediate data, which portion has already been stored in the first memory, is compressed and stored in a second memory so as to expand a free space of the first memory, and (ii) a subsequent portion of the one page of intermediate data is compressed and stored in the second memory; and reading either one of the one page of intermediate data stored in the first memory and the one page of compressed intermediate data stored in the second memory and generating bit map data from the read intermediate data.

8. A printing apparatus according to claim 7, wherein said determining step makes a determination for a band unit.

9. A memory medium, which is employed by a printing apparatus that generates bit map data from intermediate data and prints said bit map data, wherein is stored a program for determining, for each band, whether a time period for generation of bit map data based on intermediate data for the band exceeds a predetermined time period;

selecting at least one band for which said determining step determines that the time period for generation exceeds the predetermined time period, and generating bit map data based on the intermediate data of the selected band and then compressing the generated bit map data; and generating one page of bit map data based on one page of data comprising at least one band of intermediate data mixed with at least one band of compressed bit map data.

10. A memory medium according to claim 9, wherein the program performs control so that, for each band for which said determining step determines that the time period for generation does not exceed said predetermined time period, bit map data is generated that is based on said intermediate data for said band, in synchronization with reading of said bit map data.

11. A memory medium according to claim 9, wherein is stored a program for comparing the time period for generation of said bit map data by employing said intermediate data for said band with a time period for transferring said bit map data for said band to a printer engine.

12. A memory medium according to claim 9, wherein is stored a program for decompressing said data for one page, which are compressed in advance, in synchronization with reading of bit map data to reproduce said bit map data.

13. A memory medium, which is employed by a printing apparatus that generates bit map data from intermediate data and prints said bit map data, wherein is stored a program for determining whether or not said storage means is available for storing said intermediate data for one page, when as a result of determination it is ascertained that said storage means is not available for storing said intermediate data for one page, for encoding and compressing said bit map data for one page that have been generated based on said intermediate data for one page.

14. A memory medium according to claim 13, wherein print data that are externally input are sorted for a band and stored as intermediate data in said storage means.

15. A memory medium according to claim 13, wherein said band is a unit of a capacity in a band buffer size that is smaller than a size of said one page.

16. A memory medium according to claim 13, wherein is stored a program for merging bit map data that are obtained by decompressing said data that are compressed by said compression means and bit map data that are newly generated by employing said intermediate data.

17. A memory medium according to claim 16, wherein bit map data that are merged are encoded and compressed, and later the resultant data are decoded and decompressed.

18. A method employed by a printing apparatus that generates bit map data from intermediate data and prints the bit map data, said method comprising the steps of:

executing a storing operation to store one page of intermediate data in a first memory;

determining, during the storing operation in the storing step, whether the one page of intermediate data can be stored in the first memory;

controlling a data compression and storing operation such that if said determinating step determines that the one page of intermediate data cannot be stored in the first memory, (i) a portion of the one page of intermediate data, which portion has already been stored in the first memory, is compressed and stored in a second memory so as to expand a free space of the first memory, and (ii) a subsequent portion of the one page of intermediate data is compressed and stored in the second memory; and reading either one of the one page of intermediate data stored in the first memory and the one page of compressed intermediate data stored in the second memory and generating bit map data from the read intermediate data.

19. A method according to claim 18, wherein said determining step makes a determination for a band unit.

20. A method employed by a printing apparatus that generates bit map data from intermediate data and prints said bit map data, said method comprising the steps of:

determining, for each band, whether a time period for generation of bit map data based on intermediate data for the band exceeds a predetermined time period;

selecting at least one band for which said determining step determines that the time period for generation exceeds the predetermined time period, and generating bit map data based on the intermediate data of the selected band and then compressing the generated bit map data; and generating one page of bit map data based on one page of data comprising at least one band of intermediate data mixed with at least one band of compressed bit map data.

21. A method according to claim 20 further comprising performing control so that, for each band for which said determining step determines that the time period for generation does not exceed said predetermined time period, bit map data is generated that is based on said intermediate data for said band, in synchronization with reading of said bit map data.

22. A method according to claim 20, further comprising comparing the time period for generation of said bit map data by employing said intermediate data for said band with a time period for transferring said bit map data for said band to a printer engine.

23. A method according to claim 20, further comprising decompressing the data for one page, which is compressed in advance, in synchronization with reading of bit map data to reproduce said bit map data.

* * * * *

UNITED STATES PATENT AND TRADEMARK OFFICE
CERTIFICATE OF CORRECTION

PATENT NO. : 6,226,099 B1  
DATED : May 1, 2001  
INVENTOR(S) : Akio Sugaya

Page 1 of 1

It is certified that error appears in the above-identified patent and that said Letters Patent is hereby corrected as shown below:

Column 5,
Line 49, "1001" should read -- 1001, --.

Column 9,
Line 14, "to in" should read -- in --.

Column 17,
Line 7, "determinating" should read -- determining --.

Column 18,
Line 18, "determinating" should read -- determining --.

Signed and Sealed this

Eighth Day of January, 2002

*Attest:*

JAMES E. ROGAN  
*Attesting Officer*  *Director of the United States Patent and Trademark Office*